United States Patent [19]

Eldering

[11] Patent Number: 5,408,525
[45] Date of Patent: Apr. 18, 1995

[54] DIVERTER INTERFACE BETWEEN TWO TELECOMMUNICATION LINES AND A STATION SET

[75] Inventor: Charles A. Eldering, Doylestown, Pa.

[73] Assignee: General Instrument Corporation of Delaware, Hatboro, Pa.

[21] Appl. No.: 248,303

[22] Filed: May 24, 1994

[51] Int. Cl.⁶ .............................................. H04M 1/00
[52] U.S. Cl. .................... 379/162; 379/156; 379/161; 379/164; 379/165
[58] Field of Search ................. 379/156, 157, 161–166

[56] References Cited

U.S. PATENT DOCUMENTS

| | | | |
|---|---|---|---|
| 3,803,360 | 4/1974 | Morstadt | 179/2 |
| 3,965,306 | 6/1976 | Watkins | 179/81 |
| 4,132,860 | 1/1979 | Rasmussen | 379/163 |
| 4,196,316 | 4/1980 | McEowen | 179/18 |
| 4,628,153 | 12/1986 | Daly | 379/163 |
| 4,628,353 | 7/1987 | Inoue et al. | 379/162 |
| 4,685,127 | 8/1987 | Miller | 379/221 |
| 4,734,933 | 3/1988 | Barsellotti | 379/164 |
| 4,803,718 | 2/1989 | Neil | 379/164 |
| 4,817,132 | 3/1989 | Chamberlin | 379/165 |
| 4,817,312 | 3/1989 | Chamberlin | 379/162 |
| 4,852,153 | 6/1989 | Streck | 379/100 |
| 4,958,369 | 9/1990 | Tsuchida | 379/156 |
| 5,031,210 | 7/1991 | Taniguchi | 379/165 |

FOREIGN PATENT DOCUMENTS 2622380  4/1989  France .

Primary Examiner—Stephen Chin
Assistant Examiner—Vijay Shankar
Attorney, Agent, or Firm—Irwin Ostroff; Erwin W. Pfeifle

[57] ABSTRACT

A diverter interfaces first and second telecommunication lines from first and second telecommunication sources, respectively, with a third line coupled to a station set. The diverter includes separate line and set monitors and a control unit. The line and set monitors monitor and detect predetermined selective signals such as (a) ringing signals propagating on the first and second lines, and (b) line access codes, flash hook, and line change requests signals generated by the station set. In response to the detected predetermined selective signals, the line and set monitors generate first, second, and third output control signals representative of the predetermined selective signals on the first, second, and third lines, respectively, to the control unit. The control unit, which is responsive to output signals from the line and set monitors, selectively couples a predetermined one of the first and second lines directly to the third line without interfering with the predetermined selective signals and states present on the first, second, and third lines. The control unit also generates predetermined output control signals to the line and set monitors for generating output signals such as call waiting signals for transmission to the station set on the third line. The diverter is powered from the first and second lines, and its actions remain invisible to and do not affect the first and second telecommunication sources and the station set.

24 Claims, 7 Drawing Sheets

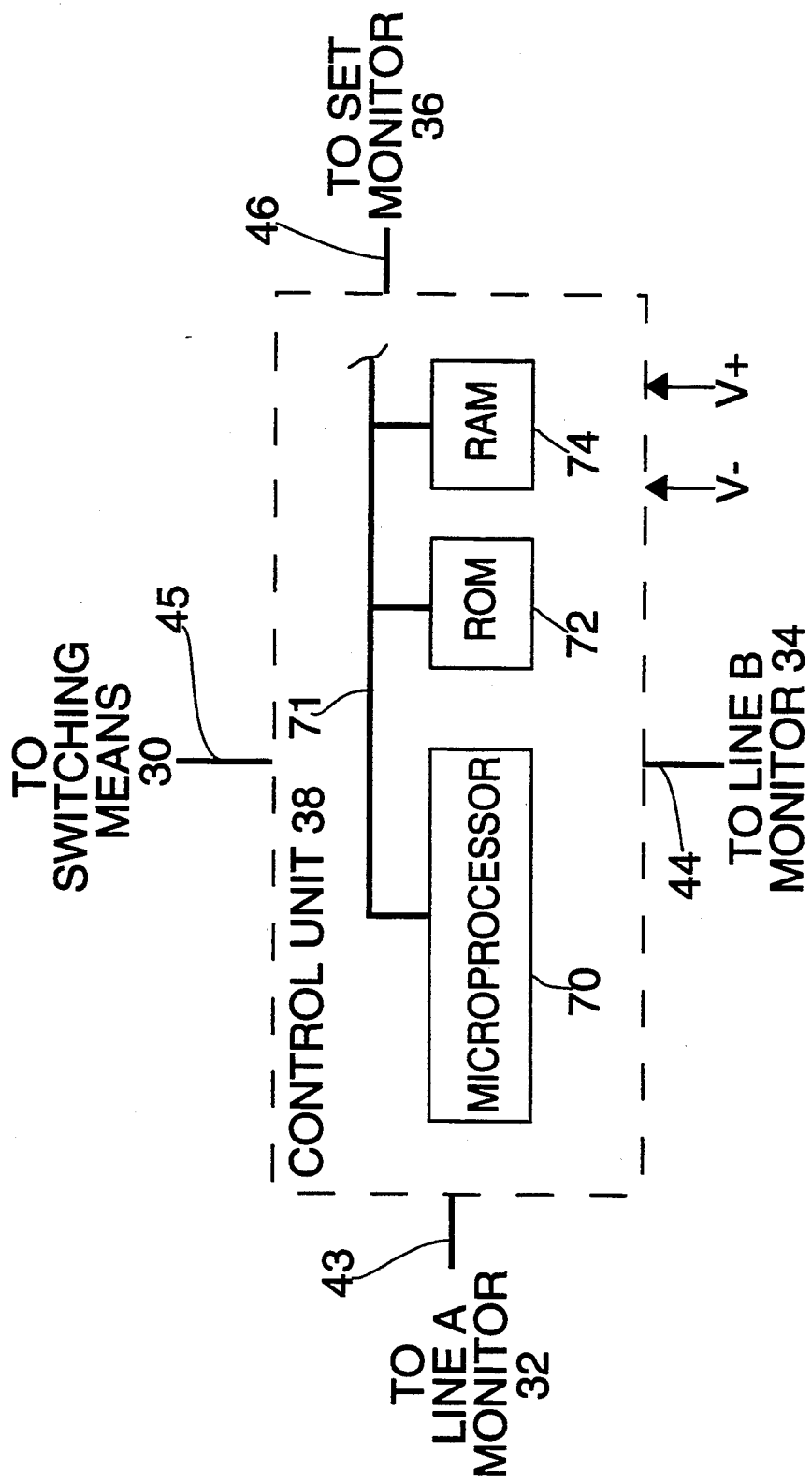

FIG. 7  TABLE   SUMMARY OF OPERATION OF DIVERTER 12

| | LINE A 15 | LINE B 15 | STATION SET | SWITCHING MEANS 30 | LINE A MONITOR 32 IMPEDANCE | LINE B MONITOR 34 IMPEDANCE | STATION SET MONITOR 35 |
|---|---|---|---|---|---|---|---|
| 1 | ON HOOK | ON HOOK | ON HOOK | CONNECTED TO PRIMARY LINE (A OR B) | HIGH | HIGH | NO ACTION |
| 2 | RINGING | ON HOOK | ON HOOK | LINE A | HIGH | HIGH | NO ACTION |
| 3 | ON HOOK | RINGING | ON HOOK | LINE B | HIGH | HIGH | NO ACTION |
| 4 | SEIZED | RINGING | OFF HOOK | LINE A | HIGH | HIGH | LINE B CALL WAITING SIGNAL GENERATED |
| 5 | SEIZED | RINGING | LINE SWITCH REQUEST GENERATED | LINE B | LOW | HIGH | DETECTS LINE SWITCH REQUEST |
| 6 | SEIZED | SEIZED | OFF HOOK | LINE A | HIGH | LOW | NO ACTION |
| 7 | SIEZED | GOES ON HOOK | SUBSCRIBER GENERATES FLASH HOOK SIGNAL | SWITCHES TO LINE A | HIGH | HIGH | DETECTS FLASH HOOK SIGNAL FOLLOWED BY LINE SWITCH REQUEST |
| 8 | RINGING | SEIZED | OFF HOOK | LINE B | HIGH | HIGH | LINE A CALL WAITING SIGNAL GENERATED |
| 9 | SEIZED | SEIZED | LINE SWITCH REQUEST GENERATED | LINE A | HIGH | LOW | DETECTS LINE SWITCH REQUEST |
| 10 | SEIZED | SEIZED | OFF HOOK | LINE B | LOW | HIGH | NO ACTION |
| 11 | SEIZED | SEIZED | SUBSCRIBER GOES ON HOOK | CONNECTED TO PRIMARY LINE (A OR B) AFTER APPROPRIATE DELAY | HIGH | HIGH | NO ACTION |
| 12 | ON HOOK | ON HOOK | SECONDARY LINE ACCESS CODE GENERATED | CONNECTED TO SECONDARY LINE (A OR B) | HIGH | HIGH | DETECTS SECONDARY LINE ACCESS CODE |

DIVERTER INTERFACE BETWEEN TWO TELECOMMUNICATION LINES AND A STATION SET

FIELD OF THE INVENTION

The present invention relates to apparatus that provides an interface between, for example, a customer's standard telephone set and first and second telecommunication lines from each of first and second telecommunication companies, respectively.

BACKGROUND OF THE INVENTION

It has traditionally been the case that a telephone customer has a single twisted pair connection to a central office of a local telecommunications company through which local and long distance service is provided. It has also become standard practice to allow long distance carriers access to a customer after the local switch, so that long distance calls are routed from a switch of the local telecommunications company to the long distance carrier's network. In recent years, the local telecommunication company has provided various services such as Call Waiting, Call Transfer, etc. that supplement the switching a calls to and from a called subscriber. Call Waiting is a service where a predetermined Call Waiting Tone is provided to a subscriber when a second call is received for a same subscriber number (or line on the switch of the local telecommunication company) when the subscriber is already busy on a first call. In response to the Call Waiting Tone, the subscriber has the option of transferring from the first call to the second call while the central office of the local company places the first call on hold. After answering the second call, the subscriber can transfer back to the first call by generating a Flash Hook signal with the Telephone Set to finish that call.

U.S. Pat. No. 4,852,153 (Streck), issued on Jul. 25, 1989, discloses a telephone/facsimile system including a plurality of telephones and a facsimile device connected to a common telephone line. The incoming calls are automatically switched from the telephones to the facsimile device as appropriately needed. Still further, the common telephone line is used for both incoming and outgoing calls by the telephones and the facsimile device, and is transparent to users. More particularly, a telephone cable enters a house or small business and is connected to a plurality of outlets to which the telephones are separately connected. One of the outlets is coupled to a master telephone which comprises switching means for separately connected a telephone and a facsimile device to the telephone line.

Various arrangements such as a Private Branch Exchange (PBX) are also known for connecting a telephone or data terminal to two telecommunication networks. More particularly, it is probable that a customer or subscriber will have both regular and alternate local access connections in the near future, implying that an additional twisted pair connection will be provided to the customer or subscriber location. This alternate connection may originate from a central location (e.g., an alternate central office), but is more likely to originate from a location remote from the alternate central office. The remote location can be, for example, an Optical Network Unit (ONU) connected via an optical fiber to a Host Digital Terminal (HDT) which is resident in, or connected to, the alternate central office, or a Coaxial network Unit (CNU) which is connected to a Host Digital Terminal (HDT) via a fiber/coaxial network (e.g., a cable television network) that is presently used to provide broadcast television programming. In either case, the subscriber is provided with two twisted pair connections. A simple solution to connecting the first and second twisted pair connections (lines) at the subscriber location is to have a first and second telephone sets (station sets) dedicated to each of the first and second lines, respectively. This is inconvenient since the subscriber generally has a number of station sets which are distributed throughout the subscriber's residence or location. Therefore, dedicating only one of these station sets for access to the alternate connection (e.g., alternate central office) does not allow for answering or originating calls on the alternate connection except from one specific location in the residence or location.

U.S. Pat. No. 4,803,360 (Morstadt), issued on Apr. 9, 1974, discloses switching apparatus permitting automatic call answering by a single data terminal having access to two telecommunication networks, or automatic call origination by the data terminal on either of the two networks. More particularly, the data terminal has access to the two telecommunication lines to automatically answer a line carrying an incoming call while excluding the other line. Still further, the data terminal manually or programmably selectively accesses one of the two telecommunication lines in accordance with data information to be transmitted to the selected telecommunication line for automatic call origination. However, when the call is answered or originated, the apparatus causes a change in the central office coupled to the telecommunication line used. For example, when a telephone call is automatically answered, a signal is sent back to the central office to cause various reactions to occur such as a disconnecting of ringing tone, etc.

It is desirable to provide apparatus which is connected to at least two telecommunication lines on one side and to a telecommunications device on the other side, which is powered from one or more of the telecommunication lines, and which automatically switches an incoming call on either of the two lines to a station device without consideration of answering the incoming call. Still further, it is desirable that the apparatus automatically switches a call originated at the station device to a desired one of the telecommunication lines. In either direction, it is desirable that the apparatus be transparent to the station device and the telecommunication lines so as not to affect the operation of either the station device or the central offices connected to the telecommunication lines. Additionally, the apparatus should advise the subscriber of an incoming call on a second line when a first line is in use without causing a busy signal to be returned on the second line, and allow the subscriber to switch from one line to the other upon receipt of a second concurrent call without losing the first call.

SUMMARY OF THE INVENTION

The present invention is directed to a diverter for location at a subscriber location and for interfacing first and second lines from remote independent sources on one side, with a third line from a remote station set on a second side. The diverter comprises monitoring means and control means. The monitoring means monitors and detects predetermined selective signals propagating on the first, second, and third lines, and generates first, second, and third output signals representative of the predetermined selective signals on the first, second, and third lines, respectively. The control means, which is responsive to output signals from the monitoring means, couples a predetermined one of the first and second lines to the third line without interfering with the predetermined selective signals and states present on the first, second, and third lines. The control means further generates predetermined output control signals to the monitoring means for generating selective output signals for transmission to the station set on the third line.

Viewed from another aspect, the present invention is directed to a diverter for interfacing first and second lines from remote independent sources on one side, with a third line from a remote station set on a second side. The diverter comprises first and second line monitors, a set monitor, and control means. The first and second line monitors monitor and detect predetermined selective signals propagating on the first and second lines, respectively. In response to such detected predetermined selective signals, the first and second line monitors provide respective first and second output signals representative of the predetermined selective signals on the first and second lines, respectively. The set monitor monitors and detects predetermined selective signals generated by the station set and propagating on the third line. Still further, the set monitor provides output signals representative of the detected predetermined selective signals from the station set, and generates predetermined output signals to the station set in response to received control signals. The control means, which is responsive to output signals from each of the first and second line monitors and the set monitor, couples a predetermined one of the first and second lines directly to the third line without interfering with signals and states present on the first, second, and third lines. The control means also generates predetermined output control signals to the set monitor for generating output signals therefrom for transmission to the station set on the third line.

Viewed from still another aspect, the present invention is directed to a method of interfacing first and second lines from remote independent sources on one side, and a third line from a remote station set on a second side. In a first step, a monitoring means monitors and detects predetermined selective signals propagating on the first, second, and third lines and provides first, second, and third output signals representative of the predetermined selective signals on the first, second, and third lines, respectively. In a second step, a control means, in response to the first, second, and third output signal in step (a), couples a predetermined one of the first and second lines directly to the third line without interfering with the predetermined selective signals and states present on the first, second, and third lines. Still further the control means generates predetermined output control signals to the monitoring means for generating output signals for transmission to the station set on the third line.

The invention will be better understood from the following more detailed description taken with the accompanying drawings and claims.

BRIEF DESCRIPTION OF THE DRAWING

FIG. 6 is a block diagram of an exemplary control unit for use in the diverter of FIG. 3 in accordance with the present invention; and FIG. 7 is a Table listing a summary of the operation of the diverter of FIG. 3 in accordance with the present invention.

The drawings are not necessarily to scale.

DETAILED DESCRIPTION

It is to be understood that corresponding elements having the same function in the several views of the drawings are provided with the same designation numbers.

Figure 1:
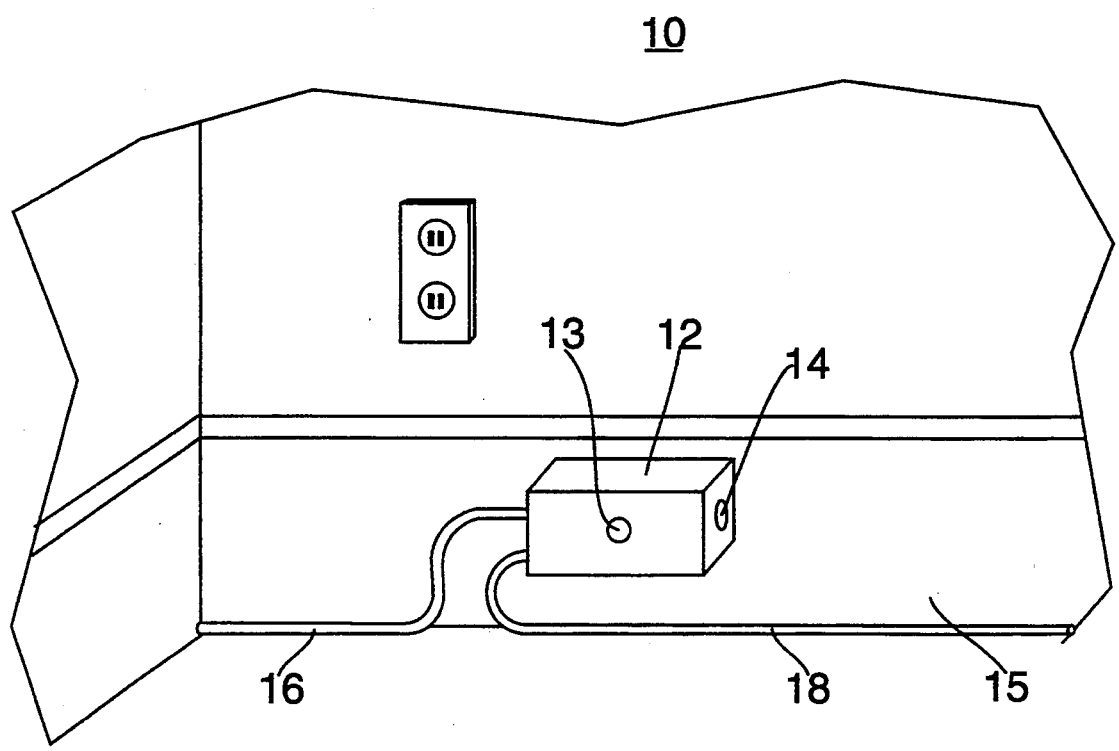
FIG. 1 is a perspective view of an indoor installation of a diverter in accordance with the present invention on a baseboard.
Figure 2:
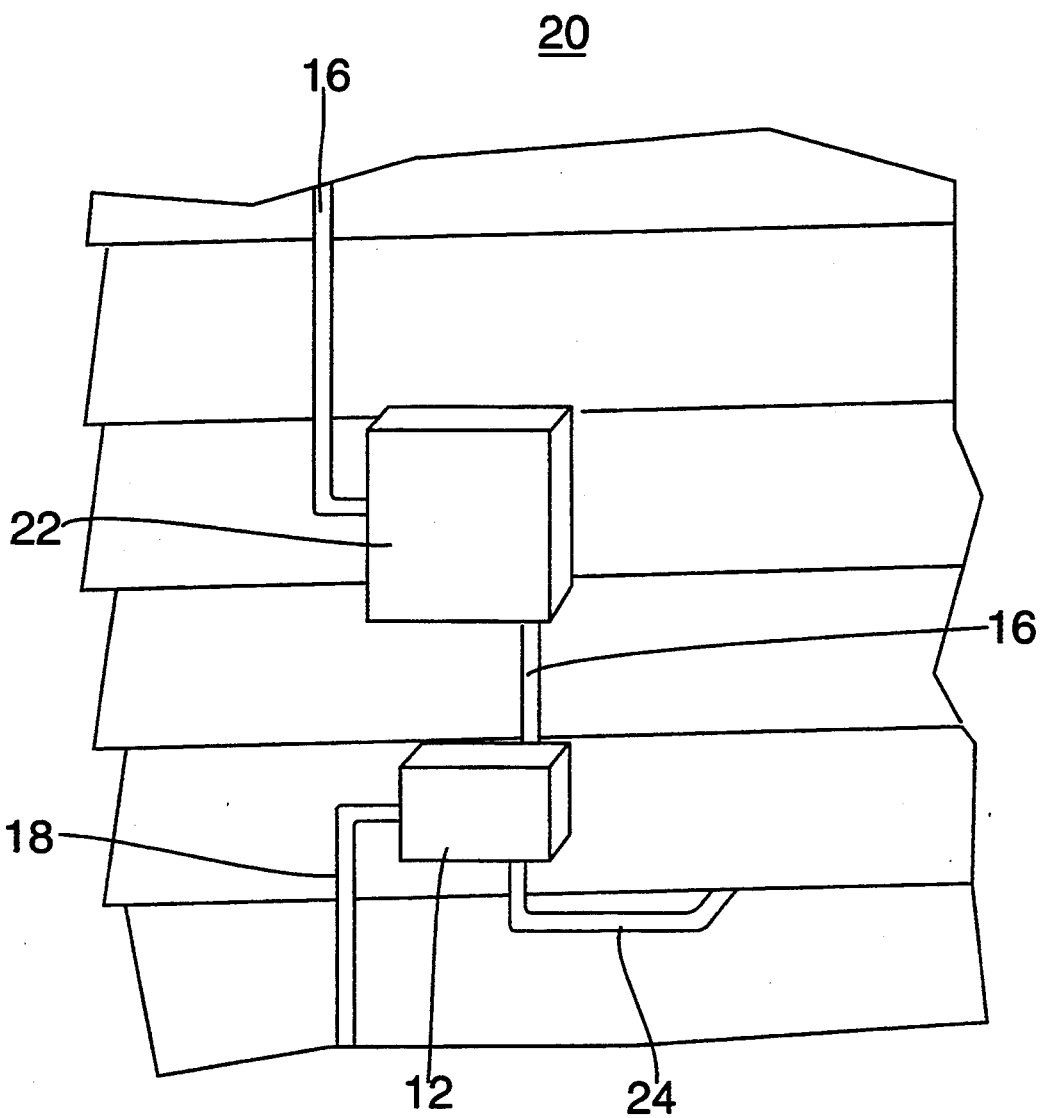
FIG. 2 is a perspective view of an outdoor installation of a diverter in accordance with the present invention on the side of a house.

Referring now to FIGS. 1 and 2, FIG. 1 shows a perspective view of an exemplary indoor installation 10 of a diverter 12 in accordance with the present invention on a baseboard 15. FIG. 2 shows a perspective view of an exemplary outdoor installation 20 of the diverter 12 on the side of a house or business location. More particularly, in the installation 10, the diverter 12 is mounted on the baseboard 15 with a screw 13. A first signal telecommunication line 16 (e.g., Line A), which generally propagates analog signals, enters the location and is connected to a first line port (not shown) on a side of the diverter 12. A second signal telecommunication line 18 (e.g., Line B), which generally propagates analog signals, enters the location and is connected to a second line port (not shown) on a side of the diverter 12. A third line port 14 on a side of the diverter 12 is usable for coupling a station set (not shown) to the diverter 12.

In the installation 20 of FIG. 2, the diverter 12 is mounted on the outside of a house or business location. A first telecommunication line 16 (e.g., Line A), as, for example, a local telecommunication company's twisted pair line, is brought through a Line A Network Termination Box 22 to a first line port (not shown) of the diverter 12. A second telecommunication line 18 (e.g., Line B), as, for example, a long distance telecommunication company's twisted pair, is brought to a second line port (not shown) of the diverter 12. A third line 24 is used to couple the diverter 12 to a station set (not shown) inside the house or business location. The power to operate the diverter 12 is received over the first and/or second telecommunication lines 16 and 18, instead of locally from within the house or business location, to enable the diverter 12 to be mounted anywhere within (as shown in FIG. 1) or outside (as shown in FIG. 2) a house or business location.

Figure 3:
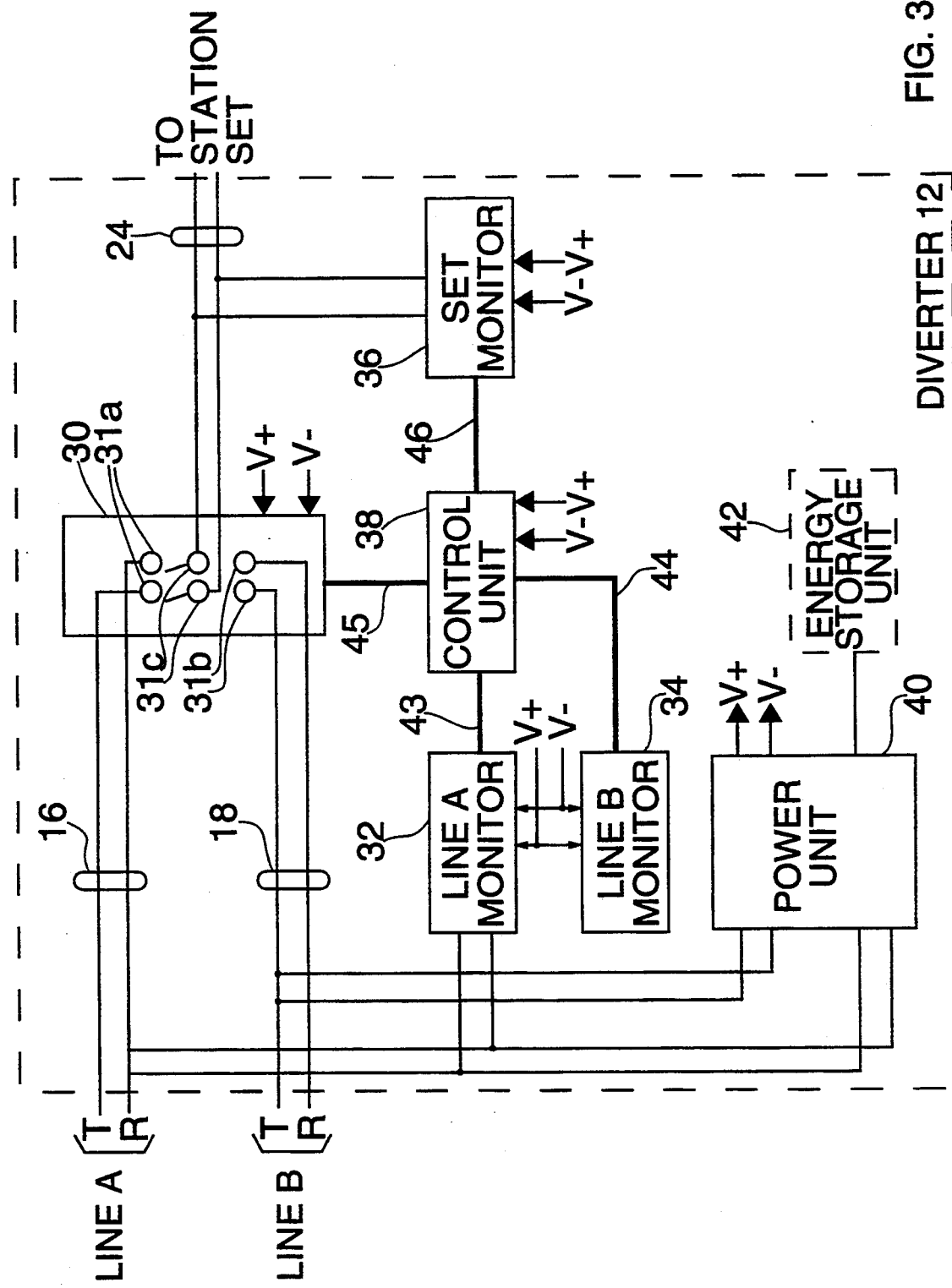
FIG. 3 is a block diagram of the diverter of FIGS. 1 and 2 in accordance with the present invention.

Referring now to FIG. 3, there is shown a block diagram of the diverter 12 shown in FIGS. 1 and 2 in accordance with the present invention. The diverter 12 comprises a Switching means 30, a Line A Monitor 32, a Line B Monitor 34, a Set Monitor 36, a Control Unit 38, a Power Unit 40, and an optional Energy Storage Unit 42. A first telecommunication line 16 (Line A) having Tip (T) and Ring (R) leads enters the diverter 12 and is terminated on a first pair of poles 31a of the Switching means 30. A second telecommunication line 18 (Line B) having Tip (T) and Ring (R) leads enters the diverter 12 and is terminated on a second pair of poles 31b of the Switching means 30. A third line 24 couples a remote station set (not shown) to a central pair of poles 31c of the Switching means 30 and to the Set Monitor 36. The pair of poles 31c are selectively connectable to either one of the pairs of poles 31a and 31b dependent on control signals from the Control Unit 38. It is to be understood that the remote station set can comprise any suitable device as, for example, a standard telephone, a computer modem, a facsimile machine, or a data terminal. For purposes of illustration hereinafter, the station set is assumed to be a standard telephone.

The telecommunication Line A 16 is also coupled to the Line A Monitor 32 and the Power Unit 40, and the telecommunication Line B 18 is also coupled to the Line B Monitor 34 and the Power Unit 40. The Power Unit 40 obtains power from Line A 16 and/or Line B 18, and generates a predetermined positive Voltage (V+) and a predetermined reference Voltage (V− or ground) which is provided to each of the Switching means 30, the Line A Monitor 32, the Line B Monitor 34, the Set Monitor 36, and the Control Unit 38. The Power Unit 40 can comprise any suitable arrangement as, for example, a diode rectifier bridge (not shown) to protect against a line polarity reversal, followed by appropriate voltage regulation circuitry (not shown). Still further, an input to the voltage regulation circuitry is typically current limited to prevent Line Cards (not shown) on Line A 16 and Line B 18 from detecting a false OFF-HOOK condition. An optional Energy Storage Unit 42 provides temporary power to the Power Unit 40 in case power is momentarily lost on the Line A 16 and/or Line B supplying external power to the Power Unit 40. Still further, the Energy Storage Unit 42 can provide power for instantaneous power requirements such as is needed for switching the Switching means 30. The Energy Storage Unit 42 can comprise any suitable device, as, for example, a rechargeable battery unit or a capacitor, which is recharged by power from Line A 16 and/or Line B 18. The Control Unit 38 is coupled to the Line A Monitor 32 by a Bus 43, to the Line B Monitor by a Bus 44, to the Switching means 30 by a Bus 45, and to the Set monitor by a Bus 46.

In operation, the diverter 12 maintains a connection between, for example, a primary telecommunication line as for example, the first telecommunication line 16 (LINE A) and the remote Station Set (not shown) by having the pairs of poles 31a connected to the pair of poles 31c in the Switching means 30. In this manner, the remote Station Set (e.g., a standard telephone) receives calls normally from Line A 16. The remote telephone subscriber using the station set (not shown) may generate calls normally over Line A 16, unless the subscriber enters an access code which indicates that the call should be sent over the second telecommunication Line B 18 (the alternate or secondary line). In other words, where the remote Station Set subscriber has local telephone service over Line A 16, and long distance service over line B 18, the subscriber has a nominal connection over Line A 16. Therefore, all local calls (normally a 7-digit number or an emergency 3-digit number) normally are transmitted over the Line A 16 to the local switching center for appropriate processing and end connection. For a long distance call, the remote subscriber enters a long distance access code which may be, for example, a "1", a "#", or a "*". The Set Monitor 36 detects and recognizes a Dial Tone MultiFrequency (DTMF) or pulse sequences, and reports valid detected access codes via control signals to the Control Unit 38 over the Bus 46. The Control Unit 38 recognizes that the control signals indicate a line change to Line B 18, and generates control signals for transmission over the Bus 45 to the Switching means 30 to cause the connection of the pair of poles 31c to the pair of poles 31b and change the line connection from Line A 16 to Line B 18.

In the event that the long distance code is a "1", it is distinguished as a long distance access code and not part of a 7-digit local number by the fact that it is a first digit dialed. Once the Control Unit 38 has been advised of a tone (or a pulse sequence recognized by a particular digit) by the Set Monitor 36, the Control Unit 38 ignores subsequent tones or pulse sequences for a period of time ranging from 100 ms to 5 seconds. In this way, a subscriber dialing a 7-digit number containing a "1" does not cause the Switching means 30 to be switched to the alternate Line B 18. If the access code presented is a "#" or a "*", the ignoring of subsequent tones or pulse sequences by the Control Unit 38 is not necessary since these codes do not appear in 7-digit local numbers. There is an exception for some calling areas which use a "*" code followed by three digits for accessing special services such as callback and call tracing. However, in these cases the access code will necessarily be a "1" or a "#". The access code can also be a longer sequence of digits such as "1#" or "10#".

The diverter 12 operates as follows when, for example, the subscriber is busy with a call on one of the Lines A 16 or Line B 18, and a call is received on the other one of the Lines A 16 or B 18. It is assumed hereinafter that the subscriber is busy with a call on the Line A 16 and another call is received on the Line B 18. The Line B Monitor 32, being coupled to Line B 18 on which the other call is being received, detects a ringing signal on Line B, and generates a control signal via the Bus 44 to the Control Unit 38 indicating such ringing signal detection. The Control Unit 38 sends a Call Waiting control signal via the Bus 46 to the Set Monitor 36. In response to the received Call Waiting control signal, the Set Monitor 36 generates a Call Waiting Tone to the Station Set (not shown) via the third line 24. The subscriber, in response to detecting the Call Waiting Tone, enters the long distance code or a predetermined line change code on the Station Set which is detected by the Set Monitor 36 and transmitted over the Bus 46 to the Control Unit 38. The Control Unit 38 responds by causing the Switching means 30 to couple the Line B 18 to the Station Set, and the Line A Monitor 16 to place a low impedance (typically 400 ohms but it can be in the range of from 100 ohms to 1,000 ohms) across the Line A 16. This generally matches the impedance presented by the Station Set to the line when the Station Set is OFF-HOOK (the receiver is off the switch hook of the Station Set and busy on a call). The change of impedance is very important, since the nominal impedance of the Line A Monitor 32 or the Line B Monitor 34 is high (greater than 10,000 ohms) to prevent a drawing of current or perturbing the line. More particularly, if the Switching means 30 switches from Line A 16 to Line B 18 and the impedance across Line A 16 goes high, it will appear that the Station Set has hung up or gone ON-HOOK (the station set is not busy on a call with a transmitter/receiver of the Station Set depressing a switch hook on the Station Set) on the Line A 16 and the call will be disconnected. By the Line A Monitor 32 placing a low impedance across the Line A 16, the call on Line A 16 is maintained (the line remains seized) while the subscriber answers the call on the second Line B 18. The subscriber can switch back to the Line A 16 call by entering a "request line switch" code, which may or may not be the same as the long distance access code. It is to be understood that the diverter 12 operates similarly, when a subscriber is busy with a call on the Line B 18 and another call is received on the Line A 16.

When the subscriber hangs up (goes ON-HOOK) from the call on Line A 16, the Set Monitor 36 detects a change of impedance at the remote Station Set via the third line 24 and notes that the change of impedance lasts longer than a flash hook. The Set Monitor 36 then transmits such detected ON-HOOK to the Control Unit 38 via the Bus 46. The Control Unit 38, after a short delay, sends signals via the Buses 43 and 44 to the Line A Monitor 32 and the Line B Monitor 34 to return, or make sure that, the impedances across the Line A 16 and the Line B 18, respectively, are placed in the high state (e.g., greater than 10,000 ohms). This prevents any call on hold on either one of the Lines A 16 or B 18 from being held indefinitely once the Station Set goes ON-HOOK.

Figure 4:
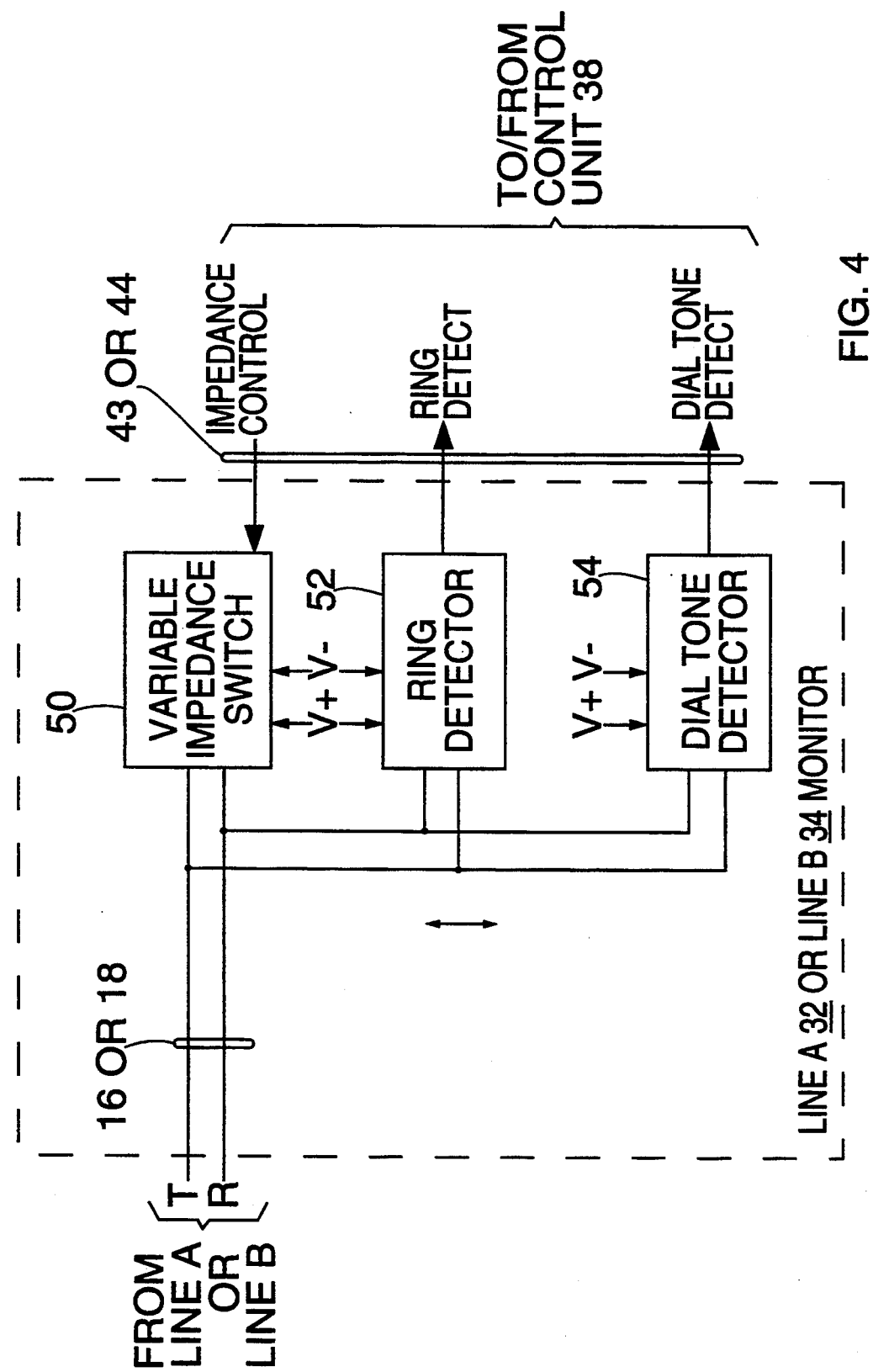
FIG. 4, is a block diagram of a local or long distance monitor of the diverter of FIG. 3 in accordance with the present invention.

Referring now to FIG. 4, there is shown (within a dashed line rectangle) a block diagram of the Line A 32 or Line B 34 Monitor of the diverter 12 in accordance with the present invention. Although the arrangement and functioning of Line A Monitor 32 in association with Line A 16 is be explained hereinbelow, it is to be understood that the arrangement and functioning of the Line B Monitor 34 is the same in association with Line B 18. The Line A Monitor 32 comprises a Variable Impedance Switch 50, a Ring Detector 52, and a Dial Tone Detector 54, which are each coupled to the Line A 16 and the Control Unit 38 via the Bus 43. Each of the Variable Impedance Switch 50, the Ring Detector 52, and the Dial Tone Detector 54 are powered by a positive potential (V+) and a negative or ground reference potential (V−) obtained from the Power Unit 40 (only shown in FIG. 3). The Variable Impedance Switch 50 functions to provide an appropriate high or low impedance across Line A 16 in response to an Impedance Control signal received via the Bus 43 from the Control Unit 38 (not shown). An low impedance (typically 400 ohms but it can be in the range of from 100 ohms to 1,000 ohms) is found across the Line A 16 when the remote Station Set (not shown) is OFF-HOOK. Alternatively, a high impedance (greater than 10,000 ohms) is found across the Line A 16 when the remote Station Set is ON-HOOK.

The Ring Detector 52 detects ringing on the Line A 16 and transmits a Ring Detect binary code to the Control Unit 38 via the Bus 43. The Control Unit 38 is responsive to the Ring Detect binary code to either cause the Switching means 30 (only shown in FIG. 3) to couple the Line A 16 to the remote Station Set via the third line 24 (if not already coupled thereto), or to cause the Set Monitor 36 to transmit a Call Waiting signal to the Station Set if the Station Set is presently busy on a call on the Line B 18. The Dial Tone Detector 54 detects if Dial Tone is present on the Line A 18 and notifies the Control Unit 38 of such detection via the Bus 43. Dial Tone may be present when the Station Set goes OFF-HOOK and the third line 24 is coupled through the Switching means 30. As stated hereinbefore, the Line B Monitor 34 is arranged and functions the same as described hereinabove for the Line A Monitor 32, but with the Line B 18.

Figure 5:
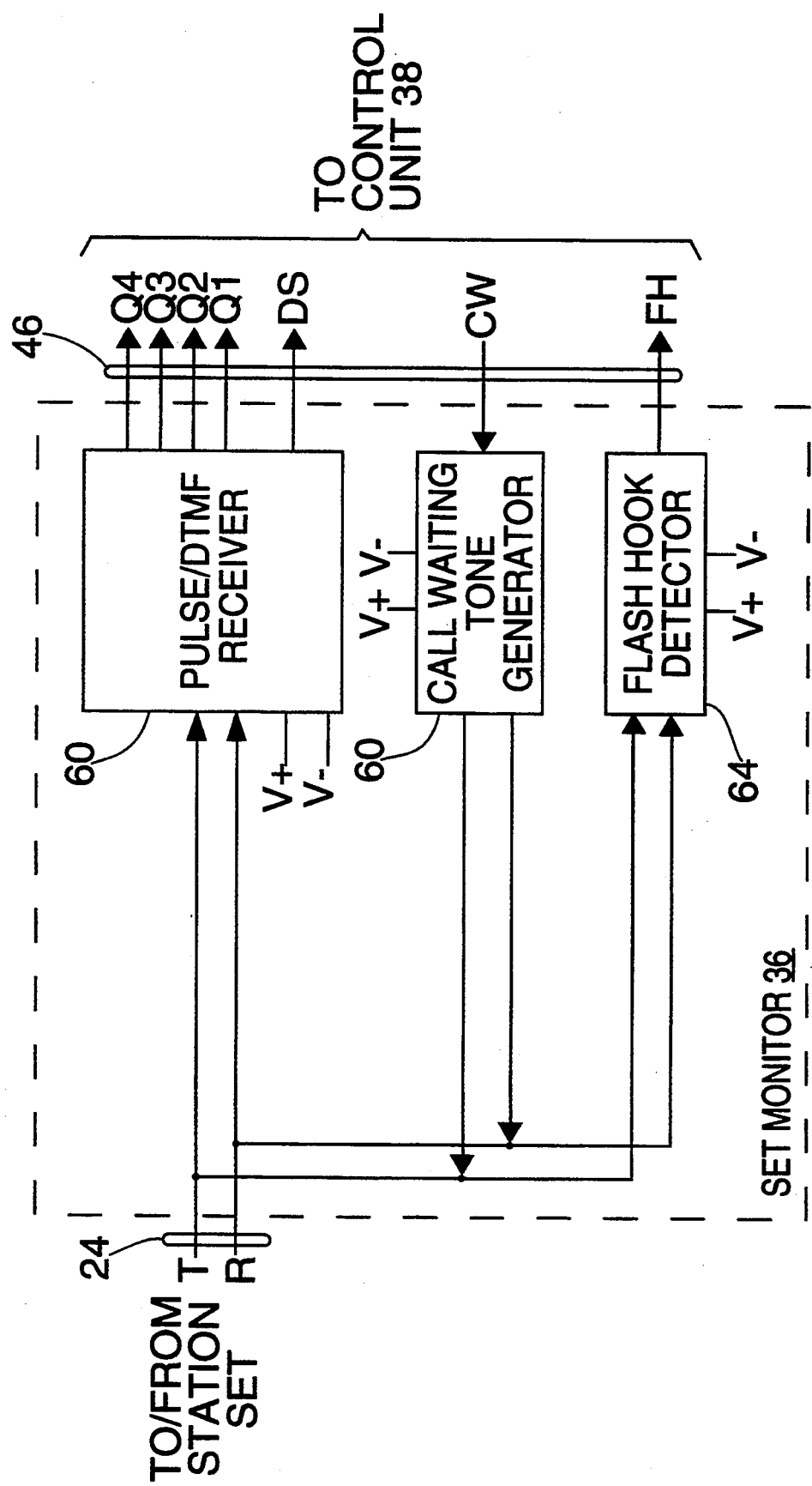
FIG. 5 is a block diagram of a set monitor of the diverter of FIG. 3 in accordance with the present invention.

Referring now to FIG. 5, there is shown (within a dashed line rectangle) a block diagram of the Set Monitor 36 of the diverter 12 in accordance with the present invention. The Set Monitor 36 comprises a Pulse/Dial Tone MultiFrequency (DTMF) Receiver 60, a Call Waiting Tone Generator 62, and a Flash Hook Detector 64, each of which is coupled on one side to the line 24 which is connected to the remote Station Set (not shown), and on the other side to the Control Unit 38 via the Bus 46. The Pulse/DTMF Receiver 60 detects and recognizes DTMF or Pulse sequence and transmits 4-bit binary representations of such sequences to the Control Unit 38 via Q1–Q4 leads of the Bus 46. The Call Waiting Tone Generator 62 is responsive to a Call Waiting (CW) control signal received from the Control Unit 38 via a CW lead of the Bus 46 to generate Call Waiting tones for transmission to the remote Station Set via the line 24. It is to be understood that the Call Waiting tones generated by the Call Waiting Tone Generator 62 may be the same or different for calls received on Line A 16 or Line B 18 (shown in FIG. 3) while the Station Set is OFF-HOOK on another call. The Flash Hook Detector 64 detects an ON-HOOK or OFF-HOOK condition at the remote Station Set, and generates appropriate binary codes to the Control Unit 38 on an FH lead of the Bus 46. When a Flash Hook followed by a line switch request is detected, the Flash Hook binary codes and appropriate binary representation of the line switch request are used by the Control Unit 38 to switch the Switching means 30 (only shown in FIG. 3) from one of the Lines A 16 and B 18 (shown in FIG. 3) currently used on a call to the other one of the Lines A 16 and B 18. Still further, the Control Unit 38 causes the Line A Monitor 32 and the Line B Monitor 34 to apply a proper impedance across the Line A 16 and Line B 18, respectively.

Referring now to FIG. 6, there is shown (within a dashed line rectangle) a block diagram of an exemplary Control Unit 38 of the diverter 12 in accordance with the present invention. The Control Unit 38 comprises a Microprocessor 70 coupled via a Bus 71 to a Read Only Memory (ROM) 72 and to a Random Access Memory (RAM) 74. The Control Unit 38 is coupled to the Line A Monitor (only shown in FIGS. 3 and 4) via the Bus 43, to the Line B Monitor 34 (only shown in FIGS. 3 and 4) via the Bus 44, to the Switching means 30 (only shown in FIG. 3) via Bus 45, and to the Set Monitor 36 (only shown in FIGS. 3 and 5) via the Bus 46, so as to facilitate an interchange of information and control signals needed for operation the diverter 12.

Referring now to FIG. 7, there is shown a Table of a summary of the operation of the Diverter 12 shown in FIG. 3 as controlled by the Control Unit 38 (shown in FIGS. 3 and 6). The Control Unit 38 is programmed (e.g., in a program stored in the ROM 72) to react to information received from each of the Line A 16 via the Line A Monitor 32, the Line B 18 via the Line B Monitor 34, and the Station Set (not shown) via the Set Monitor 36 to generate control signals and produce the results shown in the Table.

As shown in the first line across the Table, when each of the Line A 16, the Line B 18, and the Station Set are in the ON-HOOK condition indicating no calls are originated or received, the Control Unit 38 causes the Switching means 30 to couple a primary line (e.g., Line A 16 rather than Line B 18) to the Station Set. Still further, the Control Unit 38 causes the Line A Monitor 32 and the Line B Monitor 34 to maintain a high impedance across Line A 16 and Line B 18, respectively, and makes no request for action from the Set Monitor 36.

As shown in the second line of the Table, when a call is received on Line A 16, ringing is detected on Line A 16 (by he Line A Monitor 32) while each of the Line B 18 and the Station Set are ON-HOOK. In response to the ringing being received, the Control Unit 38 causes the Switching means 30 to couple the Line A 16 to the Station Set, which may be a designated primary line (Line A or B) normally coupled to the Station Set as shown in line 1 of the Table. Still further, the Control Unit 30 ensures that the Line A Monitor 32 and the Line B Monitor 34 provide a high impedance across Line A 16, and Line B 18, respectively, and makes no request for action from the Set Monitor 36. By maintaining a high impedance across the Lines A (16) and B (18), the Diverter 12 does not produce an OFF-HOOK signal on the Lines A (16) and B (18) to cause ringing to be stopped before the Station Set answers. Therefore, the Diverter remains invisible to the Lines A (16) and B (18) and the Station Set. Line 3 of the Table shows that the Control Unit 30 operates similarly when ringing is detected on Line B 18 instead of the Line A 16 as shown in line 2, except that the Switching means 30 is switched to couple Line B 18 to the Station Set.

As shown in line 4 of the Table, when the Line A 16 is busy with a call (seized) and is coupled to the Station Set which is OFF-HOOK, the Switching means 30 is currently coupling Line A 16 and the Station Set with the first call. The Line A Monitor 32 and the Line B Monitor 34 provide a high impedance across Lines A 16 and Line B 18, respectively. Since the Station Set is OFF-HOOK, the Station Set is placing a low impedance across Line A 16 in parallel with the high impedance of the Line A Monitor 32 to produce an overall low impedance across the Line A 16. At this time ringing (a second call) is received on Line B 18, and the Line B Monitor 34 notifies the Control Unit 38 of the detected ringing. In turn, the Control Unit 38 causes the Set Monitor 36 to generate a Line B 18 Call Waiting Signal to the Station Set vie the third line 24. The high impedance across the Line B 18 maintains ringing on the Line B 18 until either the Station Set answers this call or the remote caller hangs up.

As shown in line 5 of the Table, after the Station Set receives the Call Waiting signal generated in line 4 of the Table, the Station Set sends a "line switch request code" to the Set Monitor 36 in order to answer the call on Line B 18. The Set Monitor 36 detects the line switch request code, and sends such request to the Control Unit 38. In response, the Control Unit 38 causes the Line A Monitor 32 to place a low impedance across Line A 16 to maintain and hold the Line A 16 call once the Switching means 30 is switched to the Line B 18. Again, the Diverter 12 remains invisible to the telecommunication source associated with the Line A 16, and the Line B 18, and the Station Set on the third line 24.

Line 6 of the Table shows a condition where a call is present on both of Lines A 16 and B 18 and the call on Line A 16 is coupled to the Station Set while the Line B call is on hold by the low impedance placed across the Line B by the Line B Monitor 34. The condition shown in line 6 of the Table can occur after the call on Line B 18 is answered (as shown in line 5 of the Table), and the Station set has sent a Line A line switch request code to come back to the Line A 16 call while holding the Line B 18 call. The Line A line switch request code and a Line B line switch request code (used in line 5 of the Table) can be the same or different code.

Line 7 of the Table shows the condition which may occur after answering a Line B 18 call while holding a Line A 16 call (as shown in line 5 of the Table), and the Station Set wants to transfer back to the Line A 16 call while hanging up on the Line B 18 call. More particularly, to terminate the Line B 18 call and transfer back to the Line A 16 call, a subscriber produces a Flash Hook (FH) signal followed by the subscriber entering a line switch request code at the Station Set. The Flash Hook signal is produced, for example, by depressing the switch hook on a telephone station set for a predetermined very short time. The Flash Hook and line switch request code signals are detected at the Set Monitor 36 and forwarded to the Control Unit 38. The Control Unit 38 switches the Switching Means 30 to couple the Line A 16 to the Station Set and causes the Line B Monitor 34 to place a high impedance across the Line B 18. This high impedance provides an indication which corresponds to what the Station Set produces when it goes ON-HOOK, and causes the remote telecommunications office (not shown) coupled to the Line B 18 to terminate the call.

Lines 8, 9, and 10 of the Table are similar to line 4, 5, and 6 of the Table, respectively, but show a sequence when the Station Set is currently active on a call from the Line B 18 rather than from the Line A 16, and ringing (a call) is received on the Line A 16. More particularly, line 8 of the Table shows the condition where the Station Set is busy on a call from Line B 18 and ringing is received on the Line A 16. Line 9 shows the condition where the Station Set responds to the Line A call by generating a Line A switch request code, and the call is switched to the one on the Line A 16 while holding the call on the Line B 18. Line 10 of the Table shows the condition where the Station set has returned to the Line B 18 call while holding the Line A 16 call.

Line 11 of the Table shows the condition where the Station Set is coupled to calls on Lines A 16 and B 18 (both lines are seized but one is undoubtedly placed on hold), and the Station Set accidentally or deliberately goes ON-HOOK. In response to the Station Set going ON-HOOK, the Control Unit 38, after an appropriate delay which may be two or three times the length of the longest permitted Flash Hook signal, causes the Switching means 30 to couple the primary line (Line A 16 or Line B 18) to the Station Set. At that time, the Control Unit 38 also causes the Line A Monitor 32 and the Line B Monitor 34 to place a high impedance across the Lines A 16, and B 18, respectively. These high impedances represent a Station Set going ON-HOOK and cause the telecommunication offices associated with the Lines A 16 and B 18 to terminate each of the calls.

Line 12 of the Table shows a condition where the Station Set is used to originate a call on a secondary line (Line A 16 or Line B 18). More particularly, the Lines A 16 and B 18 are ON-HOOK with high impedances provided across the Lines A 16 and B 18 by the Line A Monitor 32 and Line B Monitor 34, respectively, as the secondary line access code is generated. The Set Monitor 36 detects the secondary line access code and forwards such code to the Control Unit 38 which causes the Switching means 30 (shown in FIG. 3) to couple the Station Set to the secondary line (line A 16 or Line B 18). It is to be understood, that when the subscriber lifts a telephone transmitter/receiver from its switch hook, and a primary line (e.g., Line A 16) is coupled to the Station Set (not shown) by the Switching means 30 (shown in FIG. 3), the Station Set receives a Dial Tone signal from the remote telecommunications office connected to that primary line. Once the subscriber enter an access code (e.g., a "1", "#", or "*") for a secondary line (e.g., Line B 18), the Set Monitor 36 (shown in FIG. 3) detects such access code and notifies the Control Unit 38 (shown in FIG. 3) of the received access code. The Control Unit causes the Switching Means 30 to couple the secondary line (Line B 18) to the Station Set and release the primary line (Line A) therefrom. This operation must be accomplished before the subscriber enters subsequent called party number digits (e.g., area code plus seven other digits) since the telecommunications office coupled to secondary line (Line B 18) generates another dial tone in response to the Station Set being connected thereto. This is necessary since the Set Monitor 36 (shown in FIG. 5) comprises a Pulse/DTMF receiver 60 (shown in FIG. 5) which is not capable of sending Pulse or DTMF signals over either one of the Lines A (16) and B (18). Therefore, the Set Monitor 36, the Control Unit 38, and the Switching means 30 should have a sufficient speed to respond to a secondary line access code before a subscriber normally enters the called party's number. Alternatively, the subscriber must wait for a second dial tone from a secondary line (the Line B 18) after entering an access code before continuing enter further digits to avoid lost digits that may be necessary. More particularly, it is preferable that the secondary line access code not be a "1", since the "1" may be required by the secondary telecommunications office to further direct the call to another carrier, etc.

It is to be understood that not all of the possible conditions that may be encountered by the Diverter 12 are shown in the Table of FIG. 7. In all of the conditions shown in the Table of FIG. 7 (and those not shown), the Diverter remains invisible to the Station Set and the end offices connected to the Lines A 16 and B 18.

It is to be appreciated and understood that the specific embodiments of the invention described hereinabove are merely illustrative of the general principles of the invention. Various modifications may be made by those skilled in the art which are consistent with the principles set forth. For example, the Control Unit 38 shown in FIG. 3 can be implemented by a state machine comprising gates and other devices for producing the results shown in the Table of FIG. 7, and required by the diverter 12.

What is claimed is:

1. A diverter for location at a subscriber location and for interfacing first and second lines from remote independent sources on one side, with a third line from a remote station set that is capable of generating signals consisting of one of a group of standard pulse and Dual Tone MultiFrequency (DTMF) dialing signals on a second side comprising:

monitoring means for automatically monitoring and detecting predetermined selective signals propagating on the first, second, and third lines for providing first, second, and third output signals representative of the predetermined selective signals on the first, second, and third lines, respectively; and control means, which is responsive to output signals from the monitoring means, for automatically and without a need for user intervention coupling a predetermined one of the first and second lines to the third line without interfering with the predetermined selective signals and states present on the first, second, and third lines, and for generating predetermined output control signals to the monitoring means for generating selective output signals for transmission to the station set on the third line wherein the selective output signals result in audible tones generated at the remote station set.

2. The diverter of claim 1 wherein:

the monitoring means is responsive to a ringing signal on one of the first and second lines for generating an output signal representative of such ringing signal to the control means; and the control means is responsive to the output signal representing a ringing signal from the monitoring means (a) for determining if the station set is busy on a call on the other one of the first and second lines and for automatically coupling the line on which the monitoring means is detecting the ringing signal to the station set via the third line if the station set is not busy on another call, and (b) for automatically transmitting a control signal to the monitoring means for causing the monitoring means to generate a call waiting signal to the station set when the station set is busy on a call on the other one of the first and second lines.

3. The diverter of claim 2 wherein:

the monitoring means is responsive to a line switch request signal from the station set propagating on the third line for automatically generating a line switch request control signal to the control means;

the control means is responsive to the line switch request control signal from the monitoring means for automatically generating an impedance control signal to the monitoring means, and thereafter for switching the third line from the one of the first and second lines currently coupled to the third line to the other one of the first and second lines; and the monitoring means is responsive to the impedance control signal from the control means for automatically placing a predetermined impedance across the one of the first and second lines which corresponds to an impedance produced by the station set when it is off-hook and coupled to the one of the first and second lines.

4. The diverter of claim 3 wherein:

with the station set placed on-hook while coupled to a call on one of the first and second lines and the other one of the first and second lines is on hold, the monitoring means detects the on-hook condition at the station set and automatically generates an on-hook control signal to the control means; and the control means automatically couples a primary one of the first and second lines to the third line and generates output control signals to the monitoring means for causing the monitoring means to place an impedance across each of the first and second lines which corresponds to an impedance presented by the station set when the station set is on-hook and is coupled to either one of the first and second lines.

5. The diverter of claim 1 wherein:

the monitoring means is responsive to a flash hook signal followed by a line switch request signal propagating on the third line from the station set for automatically generating a flash hook control signal and a line switch request control signal to the control means;

the control means is responsive to the flash hook control signal and the line switch request control signal from the monitoring means for automatically generating an impedance control signal to the monitoring means, and thereafter for switching the third line from one of the first and second lines currently coupled to the third line to the other one of the first and second lines; and the monitoring means is responsive to the impedance control signal from the control means for automatically placing a predetermined impedance across the one of the first and second lines which corresponds to an impedance presented by the station set when the station set is on-hook to terminate the call on that one of the first and second lines.

6. The diverter of claim 1 wherein:

the monitoring means is responsive to the station set initiating a call on the third line by generating a called number sequence indicating an access code that identifies either one of the first and second lines for automatically generating a control signal to the control means representative of such access code; and the control means is responsive to the control signal representing the access code for automatically coupling the third line to the one of the first and second lines identified by such access code.

7. The diverter of claim 1 further comprising a power unit for receiving power from at least one of the first and second lines, and for supplying a predetermined power level to the monitoring means and the control means, where the amount of power consumed by the power unit from the at least one of the first and second lines is less than that which would indicate an off-hook condition at the station set.

8. The diverter of claim 1 wherein the monitoring means comprises:

first and second line monitors for monitoring and detecting predetermined selective signals propagating on the first and second lines, respectively, and for providing respective first and second output signals representative of the predetermined selective signals on the first and second lines, respectively; and a set monitor for monitoring and detecting predetermined selective signals generated by the station set and propagating on the third line for providing output signals representative of the detected predetermined selective signals from the station set, and for generating predetermined output signals to the station set in response to received control signals from the control means.

9. The diverter of claim 1 wherein the control means comprises:

a switching means which is responsive to received predetermined control signals for selectively coupling either one of the first and second lines to the third line; and a control unit which is responsive to control signals received from the monitoring means for generating predetermined selective output control signals to the switching means and the monitoring means.

10. A diverter for interfacing first and second lines from remote independent sources on one side, with a third line from a remote station set that is capable of generating signals consisting of one of a group of standard pulse and Dual Tone MultiFrequency (DTMF) dialing signals on a second side comprising:

first and second line monitors for automatically and without a need for user intervention monitoring and detecting predetermined selective signals propagating on the first and second lines, respectively, and for providing respective first and second output signals representative of the predetermined selective signals on the first and second lines, respectively;

a set monitor for automatically and without a need for user intervention monitoring and detecting predetermined selective signals generated by the station set and propagating on the third line for providing output signals representative of the detected predetermined selective signals from the station set, and for generating predetermined output signals to the station set in response to received control signals;

control means, which is responsive to output signals from each of the first and second line monitors and the set monitor, for automatically coupling a predetermined one of the first and second lines directly to the third line without interfering with signals and states present on the first, second, and third lines, and for generating predetermined output control signals to the set monitor for automatically generating selective output signals therefrom for transmission to the station set on the third line wherein the selective output signals result in audible tones generated at the remote station set.

11. The diverter of claim 10 further comprising a power unit for receiving power from at least one of the first and second lines, and for supplying a predetermined power level to predetermined ones of the first and second line monitors, the set monitor, and the control means, where the amount of power consumed by the power unit from the at least one of the first and second lines is less than that which would indicate an off-hook condition at the station set.

12. The diverter of claim 10 wherein:

each one of the first and second line monitors is responsive to a ringing signal on the first and second lines, respectively, for automatically generating an output signal representative of such ringing signal to the control means; and the control means is responsive to the output signal representing a ringing signal from one of the first and second line monitors for determining if the station set is busy on a call on the other one of the first and second lines, and for automatically coupling the line which is associated with the one of the first and second monitors detecting the ringing signal to the station set via the third line if the station set is not busy on another call, and to automatically transmit a control signal to the set monitor for causing the set monitor to generate a call waiting signal to the station set when the station set is busy on a call on the other one of the first and second lines.

13. The diverter of claim 12 wherein:

the set monitor is responsive to a line switch request signal from the station set propagating on the third line for automatically generating a line switch request control signal to the control means;

the control means is responsive to the line switch request control signal from the set monitor for automatically generating an impedance control signal to a one of the first and second line monitors associated with the one of the first and second lines currently coupled to the third line, and thereafter for switching the third line from the one of the first and second lines currently coupled to the third line to the other one of the first and second lines; and a one of the first and second line monitors associated with the one of the first and second lines currently coupled to the third line is responsive to the impedance control signal from the control means for automatically placing a predetermined impedance across the one of the first and second lines which corresponds to an impedance produced by the station set when it is off-hook and coupled to the one of the first and second lines.

14. The diverter of claim 13 wherein:

with the station set is placed on-hook while coupled to a call on one of the first and second lines and the other one of the first and second lines is currently on hold, one of the set monitor and the first and second line monitors detects the on-hook condition at the station set and automatically generates an on-hook control signal to the control means; and the control means is responsive to the on-hook control signal for automatically coupling a primary one of the first and second lines to the third line, and for automatically generating output control signals to the first and second line monitors for causing the first and second line monitors to place an impedance across the first and second lines, respectively, which corresponds to an impedance presented by the station set when the station set is on-hook and is coupled to either one of the first and second lines.

15. The diverter of claim 12 wherein:

the set monitor is responsive to a flash hook signal followed by a line switch request signal from the station set and propagating on the third line for automatically generating a flash hook control signal and a line switch request control signal to the control means;

the control means is responsive to the flash hook control signal and the line switch request control signal from the set monitor for automatically generating an impedance control signal to the one of the first and second line monitors associated with the one of the first and second lines currently coupled to the third line, and thereafter for automatically switching the third line from a one of the first and second lines currently coupled to the third line to the other one of the first and second lines; and the one of the first and second line monitors associated with the one of the first and second line currently coupled to the third line is responsive to the impedance control signal from the control means for automatically placing a predetermined impedance across the one of the first and second lines which corresponds to an impedance presented by the station set when the station set is on-hook to terminate the call on the one of the first and second lines.

16. The diverter of claim 10 wherein:

the set monitor is responsive to the station set initiating a call on the third line by automatically generating a called number sequence indicating an access code that identifies one of the first and second lines for generating a control signal to the control means representative of such access code; and the control means is responsive to the control signal representing the access code for automatically coupling the third line to the one of the first and second lines identified by such access code.

17. The diverter of claim 10 wherein the control means comprises:

a switching means which is responsive to received predetermined control signals for selectively coupling either one of the first and second lines to the third line; and a controller which is responsive to control signals received from each of the first and second line monitors and the set monitor for generating predetermined output control signals to selective ones of the switching means, the first and second line monitors, and the set monitor.

18. The diverter of claim 13 where the station set is placed on-hook while coupled to a call on one of the first and second lines and the other one of the first and second lines is currently on hold, wherein:

one of the first and second line monitors and the set monitor detects the on-hook condition at the station set and automatically generates an on-hook control signal to the control means; and the control means is responsive to the on-hook control signal for automatically generating output control signals to the first and second line monitors for causing the first and second line monitors to place an impedance across the first and second lines, respectively, which corresponds to an impedance when the station set is on-hook and is coupled to either one of the first and second lines, and for coupling a primary one of the first and second lines to the third line.

19. A method of interfacing first and second lines from remote independent sources on one side, and a third line from a remote station set that is capable of generating signals consisting of one of a group of standard pulse and Dual Tone MultiFrequency (DTMF) dialing signals on a second side comprising the steps of:

(a) automatically monitoring and detecting without a need for user intervention predetermined selective signals propagating on the first, second, and third lines in a monitoring device for providing first, second, and third output signals representative of the predetermined selective signals on the first, second, and third lines, respectively; and (b) in response to the first, second, and third output signal in step (a), automatically coupling a predetermined one of the first and second lines directly to the third line without interfering with the predetermined selective signals and states present on the first, second, and third lines by a control device, and automatically generating predetermined output control signals to the monitoring device for automatically generating selective output signals for transmission to the station set on the third line wherein the selective output signals result in audible tones generated at the remote station set.

20. The method of claim 19 wherein:

in performing step (a), performing the substeps of:

(a1) detecting a ringing signal propagating on one of the first and second lines by the monitoring device; and (a2) generating an output signal representative of such detected ringing signal to the control device; and in performing step (b) the control device is responsive to the output signal in step (a) for performing the substeps of:

(b1) determining if the station set is busy on a call on the other one of the first and second lines, and for coupling the line on which the monitoring device is detecting the ringing signal to the station set via the third line if the station set is not busy on another call, and (b2) transmitting a control signal to the monitoring device for causing the monitoring means to generate a call waiting signal to the station set when the station set is busy on another call.

21. The method of claim 20 wherein:

in step (a), performing the further substeps of:

(a3) detecting a line switch request signal from the station set propagating on the third line by the monitoring device; and (a4) generating a line switch request control signal to the control device in response to detecting the line switch request signal in step (a3); and in step (b), performing the further substeps of:

(b3) generating an impedance control signal to the monitoring device in response to the line switch request control signal in step (a4) for causing the monitoring device to place a predetermined impedance across the one of the first and second lines which corresponds to an impedance produced by the station set when it is off-hook and coupled to the one of the first and second lines; and (b4) switching the third line from the one of the first and second lines currently coupled to the third line to the other one of the first and second lines in response to the line switch request control signal in step (a4).

22. The method of claim 19 wherein, with the station set coupled to a call on one of the first and second lines and the other one of the first and second lines is on hold, in step (a) performing the substeps of:

(a2) detecting an on-hook condition at the station set by the monitoring device; and a2) generating an on-hook control signal to the control device in response to step (a1); and in step (b), the control device performing the substeps of:

(b1) coupling a primary one of the first and second lines to the third line; and (b2) generating an output control signal to the monitoring device for causing the monitoring device to place an impedance across the first and second lines which corresponds to an impedance when the station set is on-hook and is coupled to either one of the first and second lines; and (b3) coupling a primary one of the first and second lines to the third line.

23. The method of claim 19 wherein, with the station set coupled to a call on one of the first and second lines and the other one of the first and second lines is on hold, in step (a), performing the substeps of:

(a1) detecting a flash hook signal followed by a line switch request signal propagating on the third line from the station set by the monitoring device; and (a2) generating a flash hook control signal and a line switch request control signal to the control device in response to step (a); and in step (b), the control device performing the substeps of:

(b1) generating an impedance control signal to the monitoring device in response to the flash hook control signal and the line switch request control signal for causing the monitoring device to place a predetermined impedance across one of the first and second lines currently coupled to the third line which corresponds to an impedance when the station set is on-hook on the one of the first and second lines to terminate the call on the one of the first and second lines; and (b2) switching the third line from the one of the first and second lines currently coupled to the third line to the other one of the first and second lines.

24. The method of claim 19 wherein in step (a), performing the substeps of:

(a1) detecting at the monitoring device that the station set is initiating a call on the third line by generating a called number sequence indicating an access code that identifies one of the first and second lines; and (a2) generating a control signal by the monitoring means to the control device representative of such access code; and in performing step (b), coupling the third line to the one of the first and second lines designated by such access code in response to the control signal of step (a2).

* * * * *